United States Patent [19]

Woyski

[11] Patent Number: 4,651,077
[45] Date of Patent: Mar. 17, 1987

[54] START SWITCH FOR A SINGLE PHASE AC MOTOR

[76] Inventor: Ronald D. Woyski, 1909 Cedar Creek Cir., Anaheim, Calif. 92807

[21] Appl. No.: 745,850

[22] Filed: Jun. 17, 1985

[51] Int. Cl.[4] .............................................. H02P 1/44
[52] U.S. Cl. .................................... 318/781; 318/787; 318/786; 318/785; 307/140
[58] Field of Search ............... 318/785, 786, 787, 788, 318/789, 790, 781; 307/140

[56] References Cited

U.S. PATENT DOCUMENTS

| | | | |
|---|---|---|---|
| 3,489,969 | 1/1970 | Knauer et al. | |
| 3,530,348 | 9/1970 | Conner. | |
| 3,538,411 | 11/1970 | Knauer et al. | |
| 3,573,579 | 4/1971 | Lewus | 318/787 |
| 3,671,830 | 6/1972 | Kruper | 318/786 |
| 3,746,951 | 7/1973 | Hohman. | |
| 3,761,792 | 9/1973 | Whitney et al. | 318/788 |
| 3,777,232 | 12/1973 | Woods et al. | |
| 3,970,908 | 7/1976 | Hansen et al. | 318/786 |
| 4,307,327 | 12/1981 | Streater et al. | |
| 4,375,613 | 3/1983 | Fuller et al. | 318/786 |
| 4,486,700 | 12/1984 | Kawate et al. | 318/787 |

OTHER PUBLICATIONS

Marckel, "Motor Start Switch", IBM Technical Disclosure Bulletin, vol. 14, No. 6, Nov. 1971.
Buckley, "Solid-State AC Motor Start Switch", Electrotechnology, vol. 6, No. 4, Oct. 1978.

Primary Examiner—William M. Shoop, Jr.
Assistant Examiner—Sharon D. Logan
Attorney, Agent, or Firm—Dann, Dorfman, Herrell and Skillman

[57] ABSTRACT

A start switch is provided for a single phase AC motor having a start winding and a start capacitor connected in series with the start winding and a main winding connected in parallel with the start winding and start capacitor. The AC motor is connectable with an AC power source in order to supply AC main winding voltage to the main winding and AC start winding voltage to the start winding. The start switch includes conductors connected with the main winding for sensing the AC main winding voltage and conductors connected with the start winding for sensing the AC start winding voltage. Phase sensor circuitry is employed to sense a difference in voltage phase between the start winding voltage and the main winding voltage. Detector circuitry is connected with the phase circuitry to detect when the difference in the voltage phase reaches a threshold. An AC switch is connected in series with the start capacitor and the start winding to connect and disconnect the start winding and start capacitor to and from the AC power source. Actuator circuitry for the AC switch is responsive to the detector circuitry for actuating the AC switch to disconnect the start winding and the start capacitor from the AC power source when the difference in voltage phase reaches the threshold.

9 Claims, 1 Drawing Figure

START SWITCH FOR A SINGLE PHASE AC MOTOR

FIELD OF THE INVENTION

The present invention relates to a start switch for a single AC phase motor and, more particularly, to an electrical start switch for a single phase AC motor which connects and disconnects the start winding and start capacitor of the AC motor with an AC power source in response to a selected voltage phase difference between the AC main winding voltage and the AC start winding voltage.

BACKGROUND OF THE INVENTION

Conventional single phase AC motors typically include a starting circuit which must be switched into operation in order to initially start the AC motor and must thereafter be switched out of operation as the AC motor approaches operational speed. For this purpose, the main winding of the AC motor is connected in parallel with a starting circuit which includes a series-connected start winding and start capacitor. A switch is included in the starting circuitry in series with the start capacitor and the start winding in order to operably connect and disconnect the start winding and start capacitor at the appropriate times during operation. For this purpose, various mechanical and electro-mechanical switches have been employed to operably connect and disconnect the start winding and start capacitor.

One of the more common types of starting switches currently in use is a mechanical centrifugal switch mechanism which senses the centrifugal force produced by the rotation of the rotor. At a predetermined motor speed, the centrifugal switch opens to disconnect the starting circuitry. In common electro-mechanical switches, current relays which utilize the current in the main winding as the control parameter have been utilized. In other electro-mechanical starting switches, a potential relay has been employed which utilizes the back EMF in the start winding as the control parameter.

The mechanical and electro-mechanical switches have the inherent problems of the failure of moving parts and worn contacts on the switch. For example, pin setting equipment in bowling alleys typically utilizes several motors which operate various mechanisms. At least one of the motors for the equipment is a single phase AC motor which must start and stop three times during each cycle of the machine. The motor typically employed for this purpose is a single phase AC motor having a centrifugal switch mechanism. Since the motor may often be started on the order of 15,000 times a day, the reliability of the centrifugal switch is a major concern. The failure of the centrifugal start switch causes a large percentage of the machine breakdowns.

More recently, solid state switches are being employed to replace the mechanical or electro-mechanical switches. Conventional solid state switches have used the magitude or phase difference in the main winding current and the start winding current as parameters to trigger the switch to disconnect the start winding. The problem with utilizing the magnitude of the winding currents as control parameters is that the winding currents are dependent upon motor design, size, component values, line voltage and motor loading. As a result, start switches utilizing winding currents as control parameters must either be adjusted or properly calibrated for specific applications. Like current magnitude, current phase is also a strong function of motor design and operating conditions.

Solid state switches have not been very reliable in various applications. For example, temperature variation, unusual motor loading, and marginal components may cause false triggering, erratic operation, or even failure.

Another problem which may be encountered in the use of conventional start switches for disconnecting the start winding is possible interference with the operation of an electronic brake employed on certain AC motors. Conventionally, when a dynamic brake is operated, the main winding of the motor is shorted out by placing the start capacitor in series with the main winding. If the start switch senses a parameter which causes the switch to close during the time that the brake is being applied, the effectiveness of the brake is greatly decreased.

SUMMARY OF THE INVENTION

In accordance with the present invention, a start switch for a single phase AC motor is provided which functions to efficiently and effectively disconnect the start winding and start capacitor as the motor approaches operational speed. The start switch in accordance with the invention senses the difference in phase between the main winding voltage and the start winding voltage to operably disconnect the start winding at a selected motor speed. The start switch has a wide range of applicability in use with single phase AC motors of various designs, sizes and operating characteristics.

The start switch in accordance with the present invention is for use with a single phase AC motor having a start circuit which includes a start winding and a start capacitor connected in series with the start winding. The AC motor also includes a main winding connected in parallel with the start winding and start capacitor and further includes supply means for connecting the windings and capacitor of the motor with a single phase AC power source so as to supply AC main winding voltage to the main winding and AC start winding voltage to the start winding.

The start switch includes first sensing means connected with the main winding for sensing the AC main winding voltage. Second sensing means is connected with the start winding for sensing the AC start winding voltage. Phase sensor means is connected with the first and second sensing means for sensing a difference in voltage phase between the start winding voltage and the main winding voltage. Detection means is connected with the phase sensor means for detecting when the difference in the voltage phase reaches a predetermined threshold.

To operably connect and disconnect the start winding and the start capacitor to and from the AC power source, switch means is connected in series with the start capacitor and start winding. Actuator means for the switch means is responsive to the detector means for actuating the switch means to disconnect the start winding and start capacitor from the AC power source when the difference in voltage phase reaches the predetermined threshold at a selected motor speed.

BRIEF DESCRIPTION OF THE DRAWING

The foregoing summary, as well as the following detailed description of the preferred embodiment of the present invention, will be better understood when read in conjunction with the accompanying drawings in which:

The FIGURE is a general schematic diagram of the electrical circuitry of the start switch as connected with the main winding, the start winding, and the start capacitor of a single phase AC motor.

DETAILED DESCRIPTION OF THE PREFERRED EMBODIMENT

Figure 1:
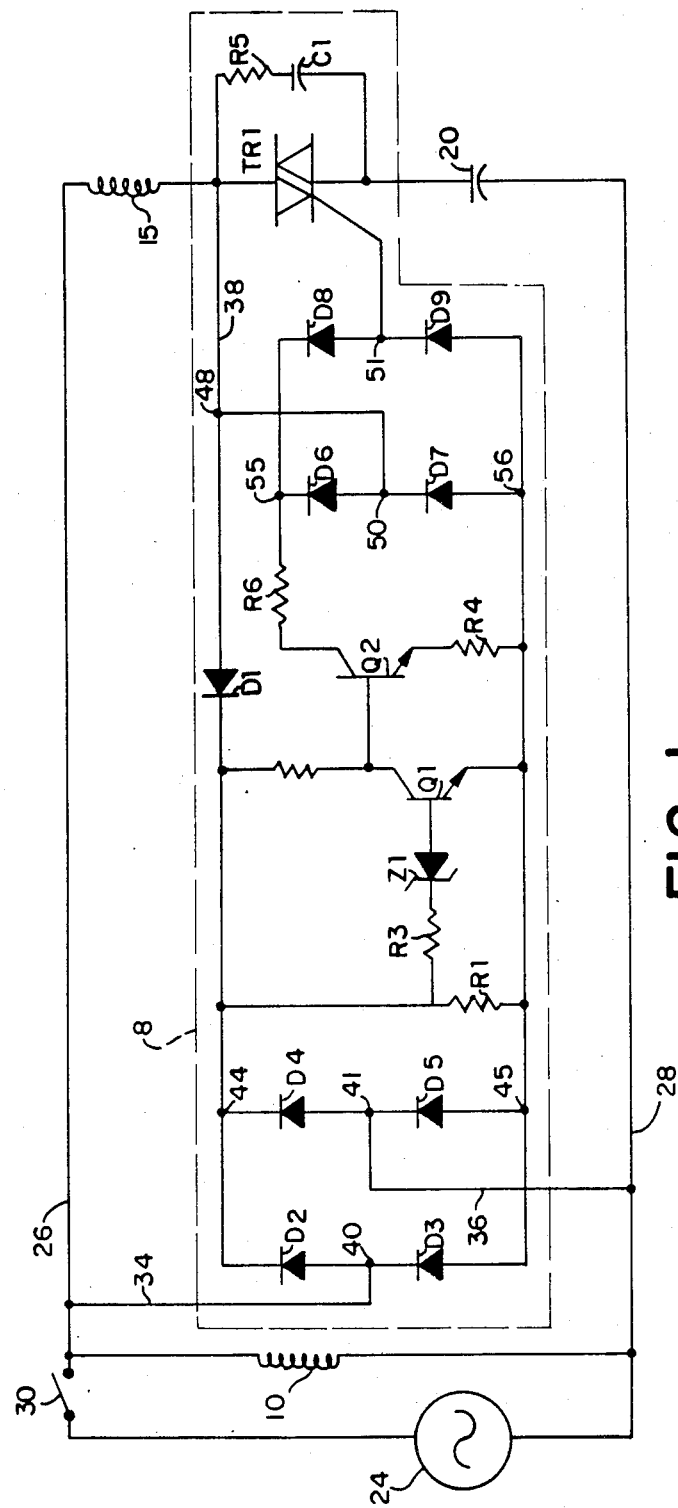

Referring to FIG. 1, the electrical circuitry of a start switch generally designated 8, for a single phase AC motor is depicted. The AC motor includes a main winding 10, a start winding 15, and a start capacitor 20. The start winding 15 is connected in series with the start capacitor 20. The main winding 10 is connected in parallel with the start winding 15 and the start capacitor 20. A single phase AC power source 24 is connected across the main winding 10 and across the series-connected start winding 15 and start capacitor 20 by conductors 26 and 28 which supply an AC main winding voltage to the main winding 10 and an AC start winding voltage to the start winding 15. A conventional on/off switch 30 may be employed to connect and disconnect the single phase AC motor with the AC power source 24.

During operation, the motor is initially turned on by closing switch 30. The AC line voltage from the AC power source 24 is applied across the main winding 10 and the series circuit comprising the start winding 15 and the start capacitor 20. The AC voltage across the main winding of the motor is equal to the AC line voltage. The voltage across the start winding, however, is equal to the sum of the back EMF generated in the start winding and the current through the start winding multiplied by the impedance of the winding. As the motor approaches operational speed, the start switch functions to disconnect the start winding 15 and the start capacitor 20 from the AC power source 24. When the start winding and start capacitor are disconnected the current through the start winding is zero so that the voltage generated in start winding is equal only to the back EMF produced in the winding.

When the motor is initially started, the start winding voltage is equal to the start winding current multiplied by the start winding impedance. At this point, the impedance of the start winding and the start capacitor is highly capacitive causing the current through the start winding and the start capacitor to lead the voltage. Since the impedence of the start winding is highly inductive, the voltage across the start winding leads the current so that the net result is that the start winding voltage is nearly 180° out of phase with the applied line voltage. As the motor approaches operational speed, the back EMF in the start winding begins to dominate so that the phase of the start winding voltage begins to shift toward 90° out of phase with respect to the line voltage. The phase shift is a function of the rotational speed of the motor and is largely independent of motor design, load and component values. By sensing the change in phase between the start winding voltage and the main winding voltage, the start winding and start capacitor can be disconnected at the appropriate time.

In order to sense the AC voltage across the main winding 10, the start switch includes conductor 34 connected with the main conductor 26 and conductor 36 which is connected with the main conductor 28. Similarly, in order to sense the AC voltage across the start winding, the start switch utilizes the conductor 34 which is connected with main conductor 26 and also includes conductor 38 which is connected on the other side of the start winding 15 opposite main conductor 26.

The AC voltage across the main winding 10 is rectified by a diode bridge comprising of diodes D2, D3, D4, and D5 having AC input terminals 40 and 41 respectively connected with conductors 34 and 36 respectively. A rectified DC main winding voltage is produced across DC output terminals 44 and 45 of the bridge.

The AC voltage across the start winding is rectified by a diode bridge comprising of diodes D1, D2, D3, and D7 having an AC input terminal 40 shared with the other diode bridge connected to conductor 26 on one side of the start winding and a separate AC input terminal 48 connected on the other side of the start winding. The DC output terminals of the bridge are common with the other bridge previously described. A rectified DC start winding voltage is produced across the shared DC output terminals 44 and 45. Since the DC output terminals 44 and 45 of the respective bridges are shared, the rectified DC main winding voltage is combined and superimposed with the rectified DC start winding voltage to provide a composite DC output voltage at the output of the bridges.

When the AC motor is initially started, the rectified DC main winding voltage and the rectified DC start winding voltage will be in phase so that the DC output voltage across DC output terminals 44 and 45 will ocillate between a minimum DC voltage of zero volts and a predetermined maximum DC voltage. As the motor increases in speed, the phase of the AC main winding voltage relative to the phase of the AC start winding voltage will change so that the resulting DC output voltage appearing across DC output terminals 44 and 45 will oscillate between a minimum DC voltage which is at a level greater than zero volts and a predetermined maximum DC voltage. As the relative phase difference between the start winding voltage and the main winding voltage increases, the minimum DC voltage across the DC output terminals 44 and 45 will also increase unitl the DC voltage always exceeds a predetermined level.

Since the oscillation the DC output voltage across the DC output terminals 44 and 45 varies according to the phase difference between the start winding voltage and the main winding voltage, the diode bridges with common DC output terminals functions as a phase sensor to sense the phase difference between the start winding voltage and the main winding voltage.

In order to detect when the DC output voltage across terminals 44 and 45 continously exceds a selected threshold which corresponds to a selected phase difference between the start winding voltage and the main winding voltage, detection circuitry is employed. Switching transistor Q1 has an emitter connected with DC output terminal 45 and a collector connected with DC output terminal 44 through a resistor R2. The base of the transistor Q1 is connected with terminal 44 through a resistor R3 and zener diode Z1. Resistor R2 limits the power through Q1.

The detection circuitry functions to instantaneous voltages below the breakdown voltage of the zener diode Z1. When the rectified main winding voltage and the rectified start winding voltage are nearly in phase, the instantaneous DC output voltage across DC output terminals 44 and 45 will oscilate between a minimum voltage of zero volts which is at a level below the breakdown voltage of the zener diode and a maximum voltage which is at a level above the breakdown voltage of the zener diode. Whenever the detected voltage across DC output terminals 44 and 45 falls below the breakdown voltage of the zener diode, Q1 will turn off and whenever the detected voltage is above the breakdown voltage of the zener diode Z1, Q1 will turn on. To dissipate stored charge in the diodes which may tend to hold the voltage above the breakdown voltage, resistor R1 is connected across the DC output terminals 44 and 45.

In order to connect and disconnect the start winding 15 and start capacitor 20 from the AC power source 24 in response to the detection circuitry, an AC switch is connected in series between the start winding 15 and the start capacitor 20. The AC switch includes a triac TR1 having main terminals and a gate and snubber circuitry. The snubber circuitry includes resistor R5 connected in series with capacitor C1 and the series snubber circuit is connected across the main terminals of the triac TR1. The snubber circuit is provided in order to keep the rate of change of the applied voltage across the triac at a rate sufficiently low to prevent false triggering. The main terminals of the triac are connected in series with the starting winding 15 and the start capacitor 20.

In order to actuate or trigger the triac in order to connect and disconnect the start winding and start capacitor, actuator circuitry is connected with the detection circuitry and the gate of the triac TR1. The actuator circuitry includes a rectifier bridge comprising diodes D6, D7, D8, and D9. The bridge includes an AC terminal 50 connected with terminal 48 and a second AC terminal 51 connected with the gate of the triac. The bridge also includes DC terminals 55 and 56. DC terminal 56 is connected with DC output terminal 45. A switching transistor Q2 has a base connected with the collector of transistor Q1. The emitter of transistor Q2 is connected with DC terminal 56 through resistor R4 and the collector of transistor Q2 is connected with terminal 55 through resistor R6. Resistor R4 is utilized to raise the input impedance of transistor Q2 in order to increase noise immunity. Resistor R6 is utilized to limit the power through transistor Q2.

The actuator circuitry is responsive to the detector circuitry for triggering the triac TR1 to connect the start winding 15 and the start capacitor 20 with the AC power source 24. As previously mentioned, when the motor is initially started, the rectified main winding voltage and the rectified start winding voltage are in phase. As a result, the instaneous output voltage across DC output terminals 44 and 45 drops below the breakdown voltage of the zener diode Z1 causing transistor Q1 to turn off repeatedly. When transistor Q1 turns off, transistor Q2 is turned on causing a current flow from the collector to the emitter of transistor Q2 which triggers the triac TR1 into a conductive state. When the triac TR1 is in the conductive state, the start winding 15 and the start capacitor 20 are connected with the AC power source 24.

As the phase difference increases between the rectified start and main winding voltages, the instantaneous DC output voltage across terminals 44 and 45, at some point, no longer drops below a threshold voltage corresponding to the breakdown voltage of the zener diode. As a result, transistor Q1 is held on which in turn holds transistor Q2 off thereby preventing the triac from triggering. As a result the triac is held in a non-conductive state so that the start winding 15 and the start capacitor 20 are disconnected from the AC power source 24 whenever the speed of the motor exceeds a predetermined rate.

It will be recognized by those skilled in the art that changes or modifications may be made without departing from the broad inventive concepts of the invention. It is understood, therefore, that the invention is not limited to the particular embodiment described herein, but is intended to cover all changes and modifications which are within the scope and spirit of the invention as set forth in the appended claims.

I claim:

1. A start switch for a single phase AC motor having a start winding and a start capacitor connected in series with said start winding, a main winding connected in parallel with the start winding and start capacitor, and supply means for connecting the windings and capacitor with a single-phase AC power source to supply AC main winding voltage to the main winding and AC start winding voltage to the start winding, the start switch comprising:
   (a) first sensing means connected with the main winding for sensing the AC main winding voltage;
   (b) second sensing means connected with the start winding for sensing the AC start winding voltage;
   (c) phase sensor means connected with the first and second sensing means for sensing a difference in voltage phase between the start winding voltage and the main winding voltage, said phase sensor means having output means for producing an output signal having a magnitude dependent on the difference in the voltage phase, the mangitude of the output signal reaching a predetermined limit when said difference in voltage phase reaches a selected threshold;
   (d) detector means connected with the phase sensor means for detecting when the difference in the voltage phase reaches the threshold, said detector means having means for detecting when the magnitude of the output signal reaches the predetermined limit;
   (e) switch means connected in series with the start capacitor and the start winding operable to connect and disconnect the start winding and the start capacitor to and from the AC power source; and
   (f) actuator means for the switch means responsive to the detector means for actuating said switch means to disconnect the start winding and the start capacitor from the AC power source when the magnitude of the output signal reaches the predetermined limit.

2. The start switch in accordance with claim 1 wherein the detector means includes (a) a detector switch having a conductive state and a non-conductive state and trigger means for triggering the detector switch to change between the conductive and non-conductive states; and (b) threshold detection means connected with the trigger means and output means for sensing when the magnitude of the output signal reaches the predetermined limit to enable the trigger means to trigger the detector signal to change states.

3. The start switch in accordance with claim 2 wherein said detector switch includes a switching transistor having a gate and conductive and non-conductive states and said trigger means includes the gate of the transistor and said threshold detection means comprises a zener diode having a breakdown voltage for triggering the switching transistor between the non-conductive and conductive states when the magnitude of the output signal reaches the predetermined limit.

4. A start switch for a single phase AC motor having a start winding and a start capacitor connected in series with said start winding, a main winding connected in parallel with the start winding and start capacitor, and supply means for connecting the windings and capacitor with a single-phase AC power source to supply AC main winding voltage to the main winding and AC start winding voltage to the start winding, the start switch comprising:
   (a) first sensing means connected with the main winding for sensing the AC main winding voltage;
   (b) second sensing means connected with the start winding for sensing the AC start winding voltage;
   (c) phase sensor means connected with the first and second sensing means for sensing a difference in voltage phase between the start winding voltage and the main winding voltage, said phase sensor means having first rectifier means connected with the first sensing means for rectifying the AC main winding voltage to produce a DC main winding voltage; second rectifier means connected with the second sensing means for rectifying the AC start winding voltage to produce a DC start winding voltage; and output means for combining the DC main winding voltage and the DC start winding voltage to produce a composite DC output signal having a magnitude dependent on the difference in the voltage phase, the magnitude reaching a predetermined limit when said difference in voltage phase reaches a threshold;
   (d) detector means connected with the phase sensor means for detecting when the difference in the voltage phase reaches the threshold, said detector means having means for detecting when the magnitude of the output signal reaches the predetermined limit;
   (e) means connected in series with the start capacitor and the start winding operable to connect and disconnect the start winding and the start capacitor to and from the AC power source; and
   (f) actuator means for the switch means responsive to the detector means for actuating said switch means to disconnect the start winding and the start capacitor from the AC power source when the difference in the voltage phase reaches the threshold.

5. A start switch in accordance with claim 4 wherein said first rectifier means includes a diode bridge having AC input terminals connected with the first sensing means to receive the AC main winding voltage and DC terminals for producing the DC main winding voltage and said second rectifier means includes a diode bridge having AC input terminals connected with the second sensing means to receive the AC start winding voltage and DC output terminals for producing the DC start winding voltage and wherein said output means includes means for connecting the DC output terminals of the first bridge with the DC output terminals of the second bridge.

6. The start switch in accordance with claim 1 wherein the switch means includes a triac having main terminals connected in series with the start winding and start capacitor and a gate connected with the actuator means for triggering the triac into a conductive state and for preventing the triggering of the triac into a conductive state when the difference in voltage phase reaches the threshold.

7. The start switch in accordance with claim 6 wherein the switch means includes a resistor and a capacitor connected in series across the main terminals of the triac.

8. A start switch for a single phase AC motor having a start winding and a start capacitor connected in series with said start winding, a main winding connected in parallel with the start winding and start capacitor, and supply means for connecting the windings and capacitor with a single-phase AC power source to supply AC main winding voltage to the main winding and AC start winding voltage to the start winding, the start switch comprising:
   (a) first sensing means connected with the main winding for senisng the AC main winding voltage;
   (b) second sensing means connected with the start winding for sensing the AC start winding voltage;
   (c) phase sensor means connected with the first and second sensing means for sensing a difference in voltage phase between the start winding voltage and the main winding voltage;
   (d) detector means connected with the phase sensor means for detecting when the difference in the voltage phase reaches a threshold;
   (e) switch means connected in series with the start capacitor and the start winding operable to connect and disconnect the start winding and the start capacitor to and from the AC power source, the switch means including a triac having main terminals connected in series with the start winding and the start capacitor and a gate for triggering the triac into a conductive state and for preventing the triggering of the triac into a conductive state; and
   (f) actuator means for the switch means responsive to the detector means for actuating said switch means to disconnect the start winding and the start capacitor from the AC power source when the difference in the voltage phase reaches the threshold, the actuator means including (a) a switching transistor having main terminals and having a gate connected with the detector means; and (b) circuitry means connected with the main terminals of the switching transistor and the gate of the triac, the switching transistor changing between conductive and nonconductive states in response to the detector means to operably trigger the triac to a conductive state, and to operably prevent the triggering of the traic to a conductive state when the difference in voltage phase reaches the threshold.

9. A start switch for a single phase AC motor having a start winding and a start capacitor connected in series with the said start winding, the main winding connected in parallel with the start winding and the start capacitor, and supply means for connecting the windings and the capacitor with a single-phase AC power source to supply AC main winding voltage to the main winding and AC start winding voltage to the start winding, the start switch comprising:
   (a) first sensing means connected with the main winding for sensing the AC main winding voltage;
   (b) second sensing means connected with the start winding for sensing the AC start winding voltage;
   (c) phase sensor means connected with the first and second sensing means for sensing a difference in voltage phase between the start winding voltage and the main winding voltage, the phase sensor means including first rectifier means connected with the first sensing means for rectifying the AC main winding voltage to produce a DC main winding voltage; second rectifier means connected with the second sensing means for rectifying the AC start winding voltage to produce a DC start winding voltage; and output means for combining the DC main winding voltage and the DC start winding voltage to produce a composite DC output signal having a magnitude dependent on the difference in the voltage phase, the magnitude reaching a predetermined limit when said difference in voltage phase reaches a threshold;

(d) detector means connected with the output means for detecting when the difference in the voltage phase reaches the threshold, the detector means including a switching transistor having conductive and non-conductive states and a gate for switching the transistor between the conductive and non-conductive states and diode means connected with the gate of the transistor and the output means for sensing when the magnitude reaches the predetermined limit to trigger the gate of the transistor to change the state of the transistor;

(e) switch means connected in series with the start capacitor and the start winding operable to connect and disconnect the start winding and the start capacitor to and from the AC power source, the switch means comprising a triac having main terminals connected in series with the start winding and the start capacitor and a gate; and (f) actuator means for the switch means responsive to the detector means for actuating the switch means to disconnect the start winding and the start capacitor from the AC power source when the difference in the voltage phase reaches the threshold, the actuator means including a switching transistor having main terminals and a gate connected with the switching transistor of the detector means, and circuitry means connected with the main terminals of the switching transistor of the actuator means and the gate of the triac, the switching transistor of the actuator means changing between non-conductive and conductive states in response to the change in state of the switching transistor of the detector means to operably prevent triggering of the triac through the circuitry means to a conductive state.

* * * * *